United States Patent

Dou et al.

(10) Patent No.: US 8,761,613 B2
(45) Date of Patent: Jun. 24, 2014

(54) EXTERNAL MODULATOR MONITORING DEVICE AND EXTERNAL MODULATOR MONITORING METHOD

(75) Inventors: Liang Dou, Beijing (CN); Zhenning Tao, Beijing (CN)

(73) Assignee: Fujitsu Limited, Kawasaki (JP)

( * ) Notice: Subject to any disclaimer, the term of this patent is extended or adjusted under 35 U.S.C. 154(b) by 570 days.

(21) Appl. No.: 12/897,331

(22) Filed: Oct. 4, 2010

(65) Prior Publication Data

US 2011/0129232 A1 Jun. 2, 2011

(30) Foreign Application Priority Data

Dec. 1, 2009 (CN) .......................... 2009 1 0222943

(51) Int. Cl.
*H04B 10/50* (2013.01)
(52) U.S. Cl.
CPC ............................... *H04B 10/50575* (2013.01)
USPC ......................................................... 398/198
(58) Field of Classification Search
USPC ......................................................... 398/198
See application file for complete search history.

(56) References Cited

U.S. PATENT DOCUMENTS

| | | | |
|---|---|---|---|
| 6,891,149 B1 | 5/2005 | Lewis et al. | |
| 6,990,296 B2 * | 1/2006 | Choudhary et al. | 398/188 |
| 7,877,020 B1 * | 1/2011 | Hayes et al. | 398/198 |
| 2009/0317075 A1 * | 12/2009 | Mandai et al. | 398/25 |

FOREIGN PATENT DOCUMENTS

| | | |
|---|---|---|
| CN | 1328637 | 12/2001 |
| JP | 2002-525597 | 8/2002 |

OTHER PUBLICATIONS

"Optical Networks: A Practical Perspective" by R. Ramaswami et al., Academic Press, 1998, pp. 192-193 and 199-200.*
Chinese Office Action mailed Apr. 15, 2013 for corresponding Chinese Application No. 200910222943.8.
Chinese Office Action mailed Oct. 15, 2013 in correspond Chinese Application No. 200910222943.8.
Japanese Office Action mailed Mar. 4, 2014 in correspond Japanese Application No. 2010-223078.
Chinese Office Action mailed Mar. 28, 2014 in correspond Chinese Application No. 200910222973.8.

* cited by examiner

*Primary Examiner* — Shi K Li
(74) *Attorney, Agent, or Firm* — Staas & Halsey LLP

(57) ABSTRACT

This invention relates to external modulator monitoring device and method for monitoring an external modulator. The external modulator monitoring device includes a mixing unit for mixing optical signals modulated by the external modulator and optical signals not modulated by the external modulator, so as to obtain multiple branches of mixed optical signals; an electrical differential unit for converting the multiple branches of mixed optical signals into corresponding multiple branches of electrical signals, and performing a differential processing on voltages of the multiple branches of electrical signals to obtain differential signals; and a power detection unit for detecting power of the differential signals.

5 Claims, 6 Drawing Sheets

EXTERNAL MODULATOR MONITORING DEVICE AND EXTERNAL MODULATOR MONITORING METHOD

CROSS-REFERENCE TO RELATED APPLICATIONS

This application claims the benefit of Chinese Patent Application No. 200910222943.8 filed with the Chinese Intellectual Property Office on Dec. 1, 2009, the disclosure of which is incorporated herein by reference in its entirety.

FIELD OF THE INVENTION

The present invention relates to communication systems, and more particularly, to modulators of transmitters in optical communication systems.

BACKGROUND OF THE INVENTION

Since the capacity of optical communication systems is required to be increasingly larger, spectrum utilization efficiency is incessantly demanded to be higher. Various complicated modulation schemes already mature in the field of wireless technology will be gradually used by optical communication systems, and the emergence of high-speed digital signal processing chips and coherent optical communication technique makes it possible to transmit optical signals having complicated modulation schemes. In comparison with the conventional intensity modulation (OOK) technique, the new modulation schemes are capable of loading information to the phase and polarization state of light, and the modulated signals can be multilevel signals. The MZ (Mach-Zehnder) modulator is the basic unit for achieving these modulation schemes.

FIG. 1 is a schematic diagram illustrating two types of conventional MZ modulators. As shown by reference numeral 101 in FIG. 1, a single-branch MZ modulator is capable of loading information contained in a driving signal on the phase or intensity of an input optical signal under a certain bias voltage. As further shown by reference numeral 102 in FIG. 1, a multi-branch MZ modulator (MZ vector modulator) is basically structured by consisting of two branches (each referred to as an interference arm) and a 90° phase shifter 103. The two upper and lower interference arms are each provided with one single-branch MZ modulator. The 90° phase shifter 103 ensures that the two branches operate in the orthogonal state. By proper setting of the respective bias voltage, the MZ vector modulator can achieve ideal QPSK modulation. If the polarization multiplexing technique is further employed, the spectrum utilization efficiency of the DP-QPSK signal as generated can be four times as high as that of the conventional OOK modulation scheme.

The current DP-QPSK has been publicly acknowledged as going to become the mainstream modulation scheme for the next-generation optical communication system. On the other hand, in order to compensate for damages inherent in the system such as chromatic aberration, in-channel nonlinearity and passband narrowing effect, it is also possible to use the MZ (vector) modulator to perform electric domain predistortion on the signal. That is to say, the predistorted driving signal is transmitted, a predistorted optical signal is obtained after passing through the MZ (vector) modulator, and a non-distorted or approximately non-distorted signal is obtained at the receiver end after passing through a link with distortion. The MZ modulator can flexibly generate various complicated modulation schemes, and can achieve quasi-linear modulation at the same time, so that it is an indispensable component part in the next-generation optical communication system.

The optical signal output from the MZ modulator as a transfer function of the driving voltage (also referred to as MZ modulator transfer function) is controlled by the bias voltage. According to difference in bias voltages, the MZ modulator can operate on a peak point, a light extinction point, and an orthogonal point. FIG. 2 exemplarily illustrates the relationship between the transfer function and the operating point of the MZ modulator. As shown in FIG. 2, the modulator operates on the light extinction point usually when the modulation scheme is QPSK or in the case of pre-compensation. The operating point of the modulator directly affects system performance, especially so with regard to system performance of the pre-compensation system. In actual circumstances, external factors (such as temperature and pressure) directly cause the operating point of the MZ modulator to shift. To ensure stable operation over a long period of time, the bias voltage is usually needed to be controlled for the MZ vector modulator. A method was proposed in US unexamined Patent application publication US 2007/0212075 disclosed on Sep. 13, 2007 for such bias control, to enable the MZ modulator to be biased on the light extinction point, namely to set the power of optical carrier as zero. US unexamined Patent application publication US 2007/0212075 is hereby incorporated by reference, as if it were completely enunciated herein. US unexamined Patent application publication 2007/0212075 directly detects the power of the carrier by the method of adding, at the output end of the modulator, an optical filter with extremely narrow band, thus effectively enhancing the precision of the feedback signal varying with the bias voltage. However, during the process of developing the present invention, inventors of the present invention found the method proposed in the above US unexamined Patent application publication is defective in the facts that the optical filter with extremely narrow band is itself very expensive, and that it is very difficult to ensure alignment of the central wavelength of the filter with respect to the wavelength of the laser.

BRIEF SUMMARY OF THE INVENTION

The present invention is proposed in view of the aforementioned and disadvantages in the prior art, and to provide at least one advantageous choice.

To achieve the objective of the present invention, there is provided, according to one aspect of the present invention, an external modulator monitoring device for monitoring an external modulator, which external modulator monitoring device comprises a mixing unit for mixing optical signals modulated by the external modulator and optical signals not modulated by the external modulator, so as to obtain multiple branches of mixed optical signals; an electrical differential unit for converting the multiple branches of mixed optical signals into corresponding multiple branches of electrical signals, and performing a differential processing on voltages of the multiple branches of electrical signals to obtain differential signals; and a power detection unit for detecting power of the differential signals.

According to another aspect of the present invention, there is provided an external modulator monitoring method for monitoring an external modulator, which method comprises a mixing process for mixing optical signals modulated by the external modulator and optical signals not modulated by the external modulator, so as to obtain multiple branches of mixed optical signals; a photovoltaic conversion process for converting the multiple branches of mixed optical signals into corresponding multiple branches of electrical signals; a differential process for performing a differential processing on voltages of the multiple branches of electrical signals to obtain differential signals; and a power detection process for detecting power of the differential signals.

With reference to the following description and accompanying drawings, these and further aspects, embodiments and features of the present invention will become more apparent. In the description and accompanying drawings, specific embodiments of the present invention are disclosed in detail, indicating modes of execution to which principles of the present invention are applicable. As should be understood, embodiments of the present invention are not restricted in scope thereby. Within spirits and provisos of the claims as attached, embodiments of the present invention subsume many variations, modifications and analogs.

Features described and/or illustrated with respect to one embodiment can be employed in, combined with, or substituted for one or more other embodiments in the same or similar manner.

As should be stress, the wording of "comprising/including" as used in the context of this application indicates the existence of a feature, an integral part, a step or a component part, but does not exclude the existence or addition of one or more other features, integral parts, steps or component parts.

DETAILED DESCRIPTION OF THE INVENTION

Schematic embodiments of the present invention will be described in greater detail below with reference to the accompanying drawings.

Figure 3:
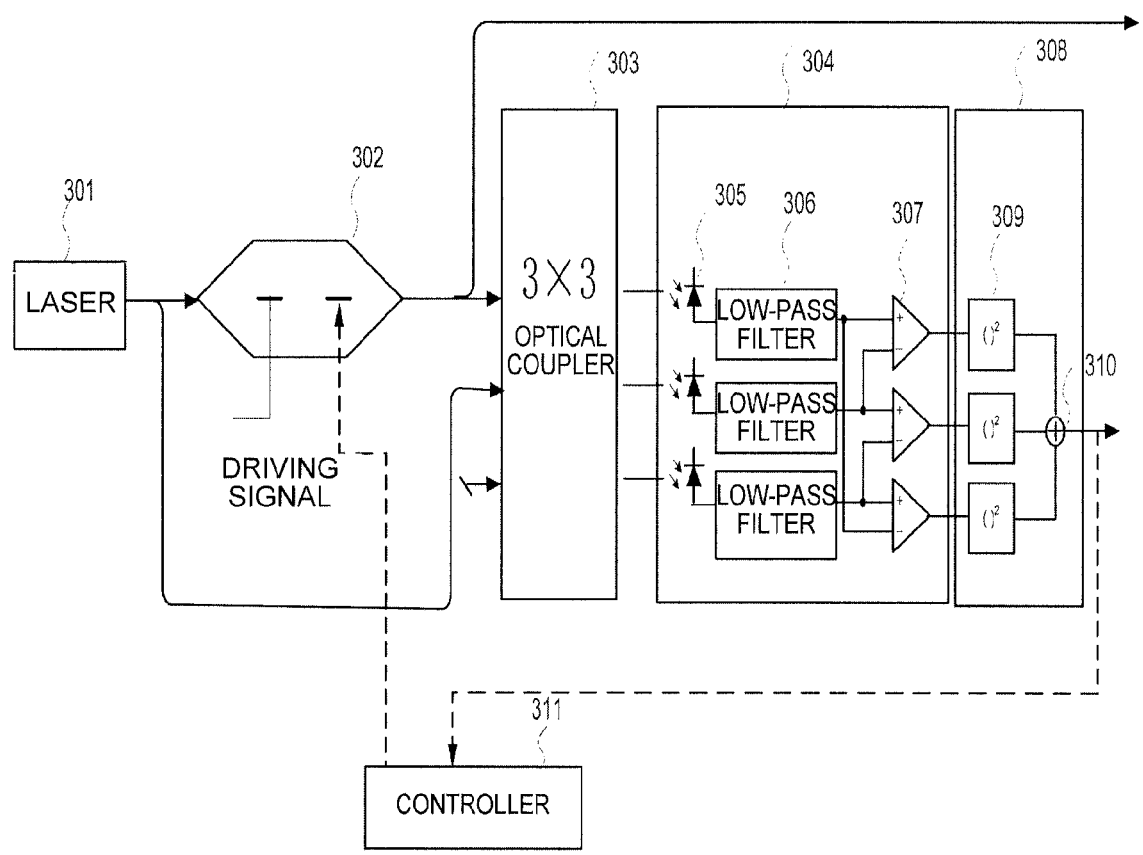
FIG. 3 is a schematic diagram illustrating a modulating unit employing the external modulator monitoring device according to one embodiment of the present invention.

FIG. 3 is a schematic diagram illustrating a modulating unit employing the external modulator monitoring device according to one embodiment of the present invention. As shown in FIG. 3, a single-branch MZ modulator is used in the modulating unit. A diagram is given for an autodyne-based bias voltage control device for an MZ modulator. As further shown in FIG. 3, light from a laser 301 is divided into two branches. One branch is further branched, after passing through the MZ modulator 302, into two parts, one of which is incident on a 3×3 optical coupler 303 simultaneously with another branch of the light from the laser 301. The 3×3 optical coupler 303 corresponds to one example of the mixing unit in the present invention. In preferred embodiments the 3×3 optical coupler 303 is a symmetrical coupler. In other words, the powers of the three resultant mixed signals are all uniformly distributed, and the phases of the three resultant mixed signals are also uniformly distributed (with each branch differing by 120° in phase with respect to the next branch). Such a mixing unit is also referred to as a symmetrical mixing unit.

The three branches of mixed signals output from the 3×3 optical coupler 303 are respectively input into three photovoltaic transformers 305, whereby they are transformed into three branches of electric signals. The three branches of electric signals are immediately input into three low-pass filters 306 for low-pass filtering to obtain three branches of low-pass filtered electric signals. The bandwidth of the low-pass filter 306 can be selected in MHz magnitude, and this also shows that the photovoltaic transformer 305 can be a low-rate device. This is so because, according to the embodiments of the present invention, after the coupled (mixed) optical signal is converted into an electric signal, the useful information is all within an extremely low frequency range, so that the subsequent devices including the photovoltaic transformer can all be of low rate, and this is also one of the advantages of the present invention. The low-pass filter 306 serves an averaging function. The three branches of filtered electric signals output from the low-pass filters 306 are input into three differential units 307. As shown in FIG. 3, the three differential units 307 respectively calculate the difference between the voltages of any two pairs of the three branches of filtered electric signal (in other words, the voltage difference is calculated). In an alternative embodiment, the differential unit 307 further includes an amplifying unit to thereby constitute a differential amplifying unit. In this application, differential units with and without amplifiers are collectively referred to as differential units.

The three photovoltaic transformers 305, three low-pass filters 306 and differential units 307 together make up the differential filter unit 304 of the present invention. In an alternative embodiment, the three low-pass filters 306 can be arranged downstream of the three differential units 307. The differential filter unit is called so regardless of whether its filter units are arranged upstream or downstream of the differential units. It is also possible to arrange additional low-pass filters downstream of the differential units 307.

In an alternative embodiment, the three low-pass filters 306 can be dispensed with. In this case, the unit made up of the three photovoltaic transformers 305 and the three differential units 307 together can be referred to as an electric differential unit.

The power detection unit 308 consists of three squarers 309 and an adder 310. The three squarers respectively obtain the squares of the three branches of differential signals output from the three differential units 307 to obtain the square values of the signals from the three branches. The adder 310 adds these three square values, to thereby monitor the output power of the MZ modulator 302. The output power is in proportion to the carrier power of the signal output from the MZ modulator 302. A controller 311 adjusts the bias voltage of the MZ modulator 302 according to the magnitude of the carrier power. Control of the MZ modulator 302 according to the power is mature technology—see, for instance, the previously mentioned US unexamined Patent application publication US2007/0212075 and U.S. Pat. No. 5,400,417 (which is hereby incorporated by reference, as if it were completely enunciated herein). The method in this US Patent cannot directly provide the adjusting direction of the bias voltage, so that it is necessary for the controller 311 to jitter the bias voltage of the current operating point, and to obtain the adjusting direction through a comparison of the measurement value with respect to the jittering amount.

Figure 4:
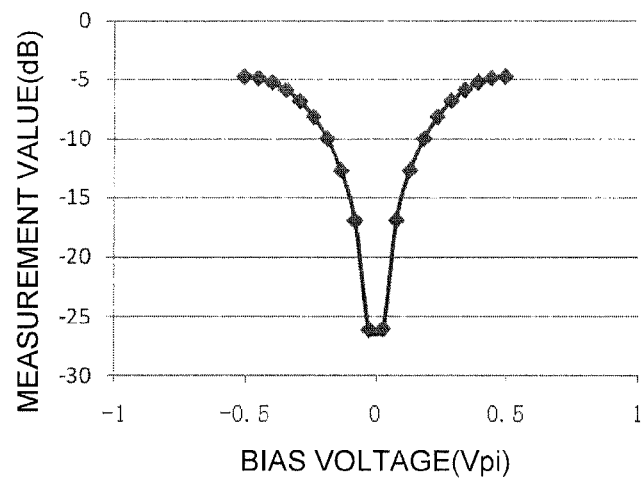
FIG. 4 illustrates simulation result of a measurement value of the external modulator monitoring device according to one embodiment of the present invention varying with the bias voltage.

FIG. 4 illustrates simulation result of a measurement value of the external modulator monitoring device according to one embodiment of the present invention varying with the bias voltage. As can be seen, when the MZ modulator operates on the light extinction point (with the bias voltage being 0), the detected carrier power is at the minimum, so that it is possible to monitor the external modulator by the measurement value of the external modulator monitoring device. The bandwidth of the filter is 1 MHz in the simulation.

Figure 5:
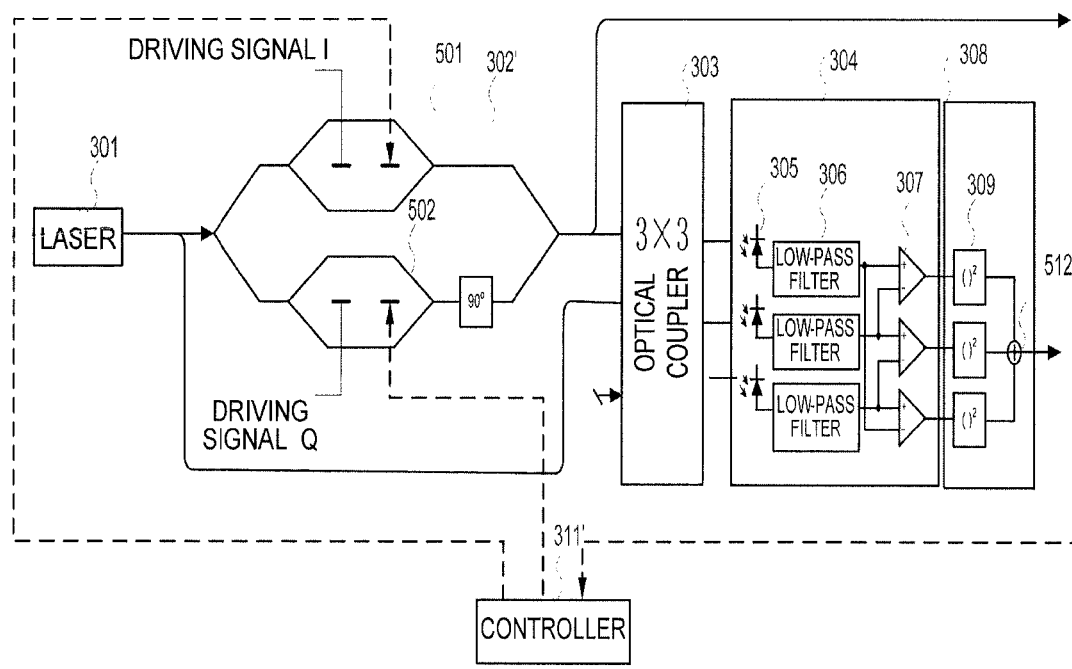
FIG. 5 is a schematic diagram illustrating another modulating unit employing the external modulator monitoring device according to one embodiment of the present invention.

FIG. 5 is a schematic diagram illustrating another modulating unit employing the external modulator monitoring device according to one embodiment of the present invention. As shown in FIG. 5, a double-branch MZ modulator 302' is used in this modulating unit, and a controller 311' controls the bias voltages of two single-branch MZ filters 501 and 502 on the two branches of the double-branch MZ modulator 302'. The remaining component parts are identical with those described in combination with FIG. 3, and are hence not repetitively described here.

Figure 6:
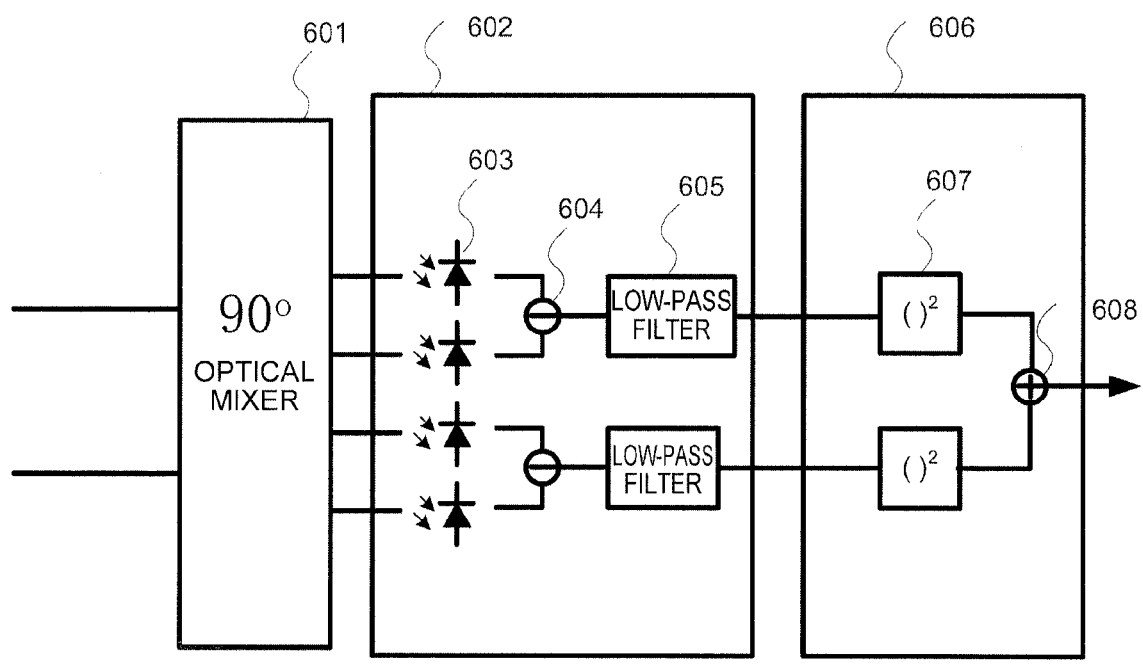
FIG. 6 is a functional block diagram of the external modulator monitoring device according to another embodiment of the present invention.

FIG. 6 is a functional block diagram of the external modulator monitoring device according to another embodiment of the present invention. As shown in FIG. 6, optical signals modulated by the modulator and not modulated by the modulator firstly enter a 4×4 optical coupler 601 (90° optical mixer). The 4×4 optical coupler 601 corresponds to an example of the mixing unit in the present invention. In preferred embodiments, the 4×4 optical coupler 601 is a symmetrical coupler. In other words, the powers of the four resultant mixed signals are all uniformly distributed, and the phases of the four resultant mixed signals are also uniformly distributed (with each branch differing by 90° in phase with respect to the next branch). Such a mixing unit is also referred to as a symmetrical mixing unit.

The four branches of mixed signals output from the 4×4 optical coupler 601 are respectively input into four photovoltaic transformers 603 to be converted thereby into four branches of electric signals. The four branches of electric signals are subsequently input into two differential units 604. The two differential units 604 respectively obtain the differences between voltages of two adjacent branches of electric signals of the four branches of electric signals, to thereby obtain two branches of differential signals. For instance, if the four branches of electric signals are numbered as branch 1, branch 2, branch 3 and branch 4, the first differential unit 604 obtains the difference between voltages of signals between branch 1 and branch 2, and the second differential unit 604 obtains the difference between voltages of signals between branch 3 and branch 4, to thereby obtain two branches of differential signals.

The two branches of differential signals are respectively low-pass filtered by two low-pass filters 605. The two differential units 604, four photovoltaic transformers 603 and two low-pass filters 605 make up the differential filter unit 602 of the embodiment of the present invention. It is also possible to dispense with the low-pass filters 605, in which case the differential filter unit 602 is simplified as an electric differential unit.

Two branches of filtered electric signals output from the two low-pass filters 605 are input into a power detection unit 606. The power detection unit 606 consists of two squarers 607 and an adder 608. The two squarers 607 respectively obtain the squares of the two branches of filtered electric signals output from the two low-pass filters 605 to obtain the square values of the signals of the two branches. The adder 608 adds the square values of the signals of the two branches, to thereby monitor the output power of the MZ modulator (such as the MZ modulator 302). The output power is in proportion to the carrier power of the signal output from the MZ modulator 302. The controller 311 as shown in FIG. 3 can adjust the bias voltage of the MZ modulator 302 or control the 90° phase shifter 103 according to the magnitude of the carrier power.

As should be noted, it is also possible to arrange the low-pass filters 605 in FIG. 6 upstream of the differential unit 604, but four low-pass filters are needed in this case.

Figure 1:
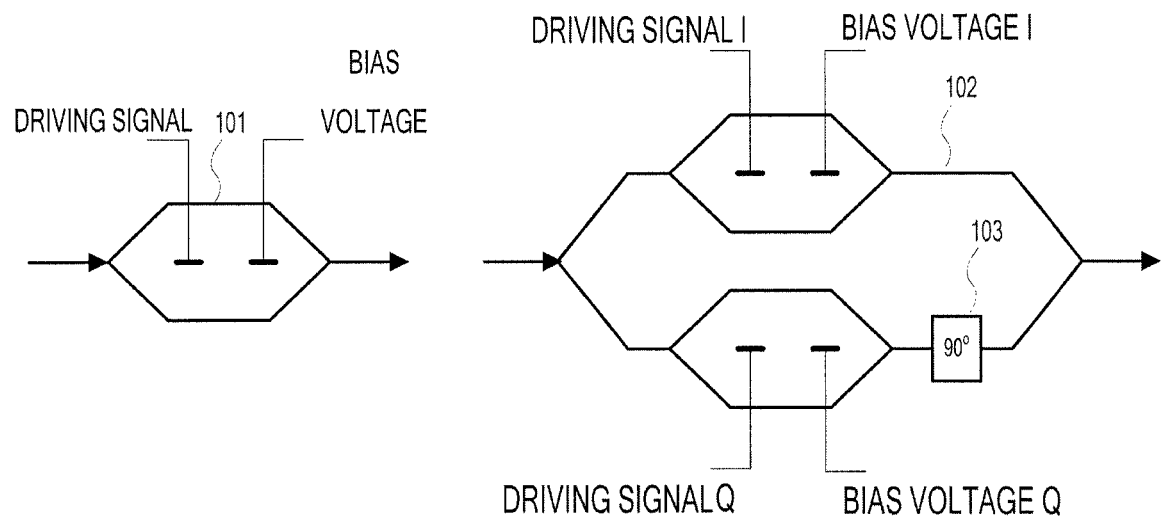
FIG. 1 is a schematic diagram illustrating two types of conventional MZ modulators.
Figure 2:
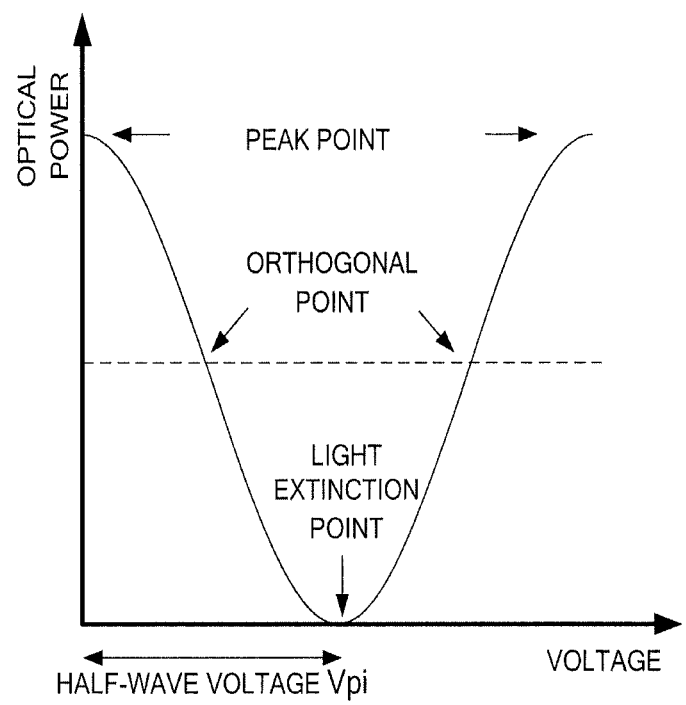
FIG. 2 exemplarily illustrates the relationship between the transfer function and the operating point of the MZ modulator.

In addition to the two types of conventional MZ modulators as shown in FIG. 1, embodiments of the present invention are also applicable to other types of combinations based on MZ modulators. The methods according to the embodiments of the present invention are applicable to any external modulators operating on the light extinction point. The external modulator stands for a modulator that modulates the light emitted from a laser external to the laser.

Additionally, although description is made in the aforementioned embodiments on the basis of the 3×3 optical couplers and the 4×4 optical couplers performing the mixing, as should be aware to persons skilled in the art, it is also possible to make use of optical couplers with more branches, such as 5×5 optical couplers. When such optical couplers are used, the number of the downstream photovoltaic transformers, differential units and low-pass filters can be correspondingly increased or reduced.

Figure 7:
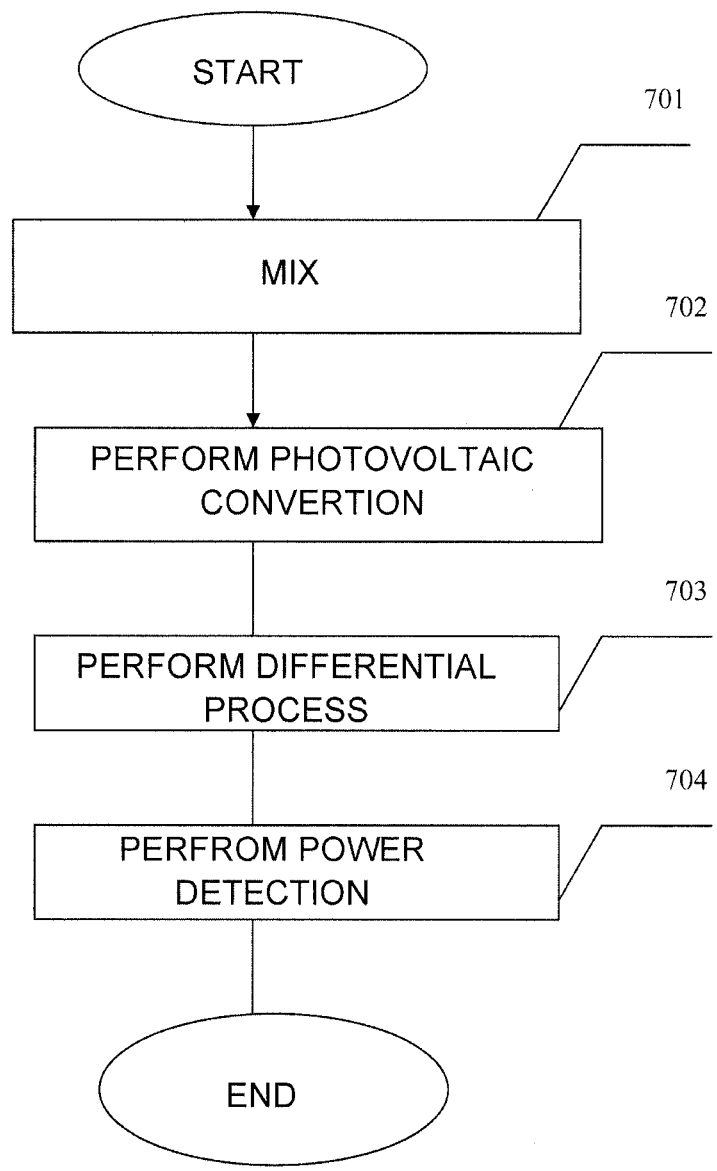
FIG. 7 illustrates the external modulator monitoring method according to one embodiment of the present invention.

FIG. 7 illustrates the external modulator monitoring method according to one embodiment of the present invention. As shown in FIG. 7, according to the external modulator monitoring method, mixing is firstly performed in Step 701. That is to say, optical signals modulated by the external modulator and not modulated by the external modulator are mixed to obtain multiple branches of mixed optical signals. As previously mentioned, 3×3 optical couplers can be used in this step to mix to obtain three branches of mixed signals, and 4×4 optical couplers can also be used to mix to obtain four branches of mixed signals. Of course, other optical couplers can also be used to obtain more branches of mixed signals.

Photovoltaic transformation is then performed in Step 702, whereby the multiple branches of mixed optical signals are converted into corresponding branches of electric signals. This can be carried out via photovoltaic transformers, for instance.

Subsequently in Step 703, differential processing is performed on the multiple branches of electric signals to obtain differential signals. Specifically, as regards the circumstance in which 3×3 optical couplers mix to obtain three branches of mixed signals, it is possible to use three differential units to respectively obtain differences of voltages between any two of the three branches of signals; as regards the circumstance in which 4×4 optical couplers mix to obtain four branches of mixed signals, it is possible to use two differential units to respectively obtain differences of voltages between two adjacent branches of signals of the four branches of signals.

Preferably, a filtering step can be further added before or after the differential processing to filter each branch of signal.

Finally, power detection is performed in Step 704 for detecting the power of the signals having been performed with the differential processing.

Each of the constituent modules, units and subunits in the aforementioned device and each of the steps in the aforementioned method can be configured by software, firmware, hardware or a combination thereof. Specific means or modes employed for the configuration are well known to those skilled in the art, and are hence not repetitively described here. In the case of implementation through software or firmware, programs constituting the software are installed, from a storage medium or a network, in a computer (such as the general-purpose computer 800 shown in FIG. 8) having a dedicated hardware structure or a computer incorporated into the system or device (such as a transmitter). When the computer is installed with the various programs, it can execute the various functions.

Figure 8:
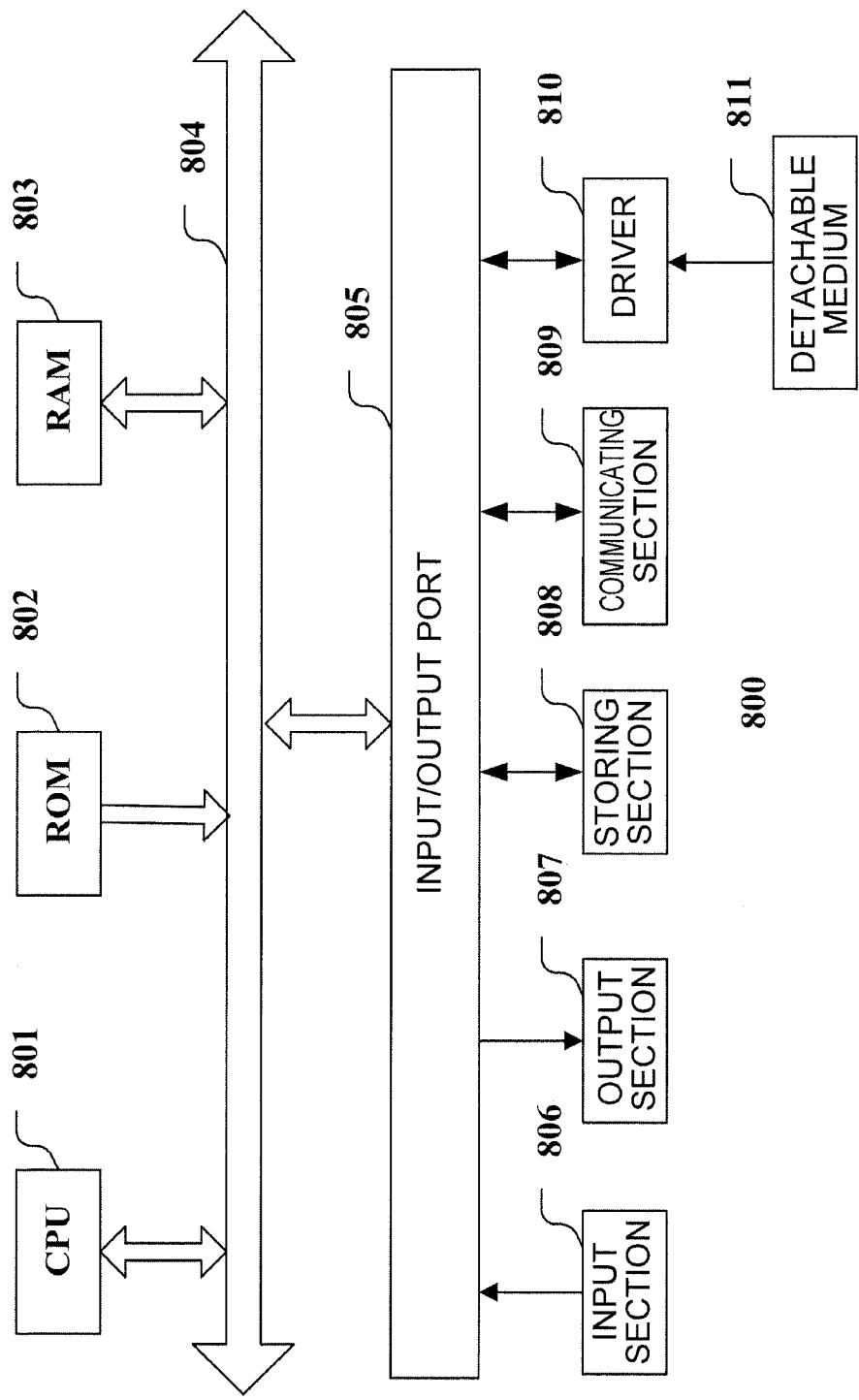
FIG. 8 is a schematic block diagram illustrating a computer for executing the method and device according to the embodiments of the present invention.

FIG. 8 is a schematic block diagram illustrating a computer applicable for executing the method and device according to the embodiments of the present invention.

In FIG. 8, a central processing unit (CPU) 801 executes various processes in accordance with programs stored in a read-only memory (ROM) 802 or programs loaded from a storing section 808 into a random access memory (RAM) 803. Further stored in RAM 803 is data needed when CPU 801 executes various processes on practical demand. CPU 801, ROM 802 and RAM 803 are connected with one another via a bus 804. As practically demanded, an input/output port 805 can also be connected with the bus 804.

As practically demanded, the following component parts can be connected with the input/output port 805: an input section 806 (including a keypad, a mouse, etc.), an output section 807 (including a display, such as a cathode ray tube (CRT), a liquid crystal display (LCD), and a speaker, etc.), a storing section 808 (including harddisk, etc), and a communicating section 809 (including a network interface card such as an LAN card, and a modem, etc.). The communicating section 809 executes communicating process via a network such as the Internet. On practical demand, a driver 810 can also be connected with the input/output port 805. A detachable medium 811, such as a magnetic disk, an optical disk, a magneto-optical disk, a semiconductor memory etc., can be mounted on the driver 810 as practically demanded to enable computer programs read therefrom to be installed in the storing section 808 as practically demanded. The computer may only consist of CPU 801, ROM 802 and RAM 803 connected via bus 804.

In the case the aforementioned series of processes are realized via software, programs constituting the software are installed from a network, such as the Internet, or a storage medium, such as the detachable medium 811.

As should be understood by persons skilled in the art, the storage medium is not restricted to the detachable medium 811 as shown in FIG. 8 for storing programs therein, and separated from the device to provide users with programs. Examples of the detachable medium 811 include magnetic disk (including floppy disk (registered trademark)), optical disk (including optical disk read-only memory (CD-ROM) and digital versatile disk (DVD)), magneto-optical disk (including mini-disc (MD) (registered trademark)) and semiconductor memory. Alternatively, the storage medium may be hardware contained in ROM 802 or storing section 808, which hardware stores programs therein and is distributed to users together with the device containing it.

Excursus 1: An external modulator monitoring device for monitoring an external modulator, which device comprises: a mixing unit for mixing optical signals modulated by the external modulator and optical signals not modulated by the external modulator, so as to obtain multiple branches of mixed optical signals; an electrical differential unit for converting the multiple branches of mixed optical signals into corresponding multiple branches of electrical signals, and performing a differential processing on voltages of the multiple branches of electrical signals to obtain differential signals; and a power detection unit for detecting power of the differential signals.

Excursus 2: The external modulator monitoring device according to Excursus 1, wherein the mixing unit is a 3×3 optical coupler for mixing optical signals modulated by the external modulator and optical signals not modulated by the external modulator into three branches of mixed optical signals; the electrical differential unit is a differential filter unit comprising: three photovoltaic conversion units for respectively converting the three branches of mixed optical signals into electrical signals, so as to obtain three branches of electrical signals; three filter units for respectively filtering the three branches of electrical signals, so as to obtain three branches of filtered electrical signals; three differential units for obtaining differences between the voltages of every two branches of filtered electrical signals among the three branches of filtered electrical signals, so as to obtain three branches of differential signals; the power detection unit comprises: three squarers for respectively squaring the three branches of differential signals, so as to obtain three branches of square values; and an adder for obtaining a sum of the three branches of square values.

Excursus 3: The external modulator monitoring device according to Excursus 1, wherein the mixing unit is a 3×3 optical coupler for mixing optical signals modulated by the external modulator and optical signals not modulated by the external modulator into three branches of mixed optical signals; the electrical differential unit is a differential filter unit that comprises: three photovoltaic conversion units for respectively converting the three branches of mixed optical signals into electrical signals, so as to obtain three branches of electrical signals; three differential units for obtaining differences between the voltages of every two branches of electrical signals among the three branches of electrical signals, so as to obtain three branches of differential signals; three filter units for respectively filtering the three branches of differential signals, so as to obtain three branches of filtered differential signals; the power detection unit comprises: three squarers for respectively squaring the three branches of filtered differential signals, so as to obtain three branches of square values; and an adder for obtaining a sum of the three branches of square values.

Excursus 4: The external modulator monitoring device according to Excursus 1, wherein the mixing unit is a 4×4 optical coupler for mixing optical signals modulated by the external modulator and optical signals not modulated by the external modulator into four branches of mixed optical signals; the electrical differential unit is a differential filter unit that comprises: four photovoltaic conversion units for respectively converting the four branches of mixed optical signals into electrical signals, so as to obtain four branches of electrical signals; two differential units for obtaining differences between two adjacent branches among the four branches of electrical signals, so as to obtain two branches of differential signals; two filter units for respectively filtering the two branches of differential signals, so as to obtain two branches of filtered electrical signals; the power detection unit comprises: two squarers for respectively squaring the two branches of filtered electrical signals, so as to obtain two branches of square values; and an adder for obtaining a sum of the two branches of square values.

Excursus 5: The external modulator monitoring device according to Excursus 1, wherein the mixing unit is a 4×4 optical coupler for mixing optical signals modulated by the external modulator and optical signals not modulated by the external modulator into four branches of mixed optical signals; the electrical differential unit is a differential filter unit that comprises: four photovoltaic conversion units for respectively converting the four branches of mixed optical signals into electrical signals, so as to obtain four branches of electrical signals; four filter units for respectively filtering the four branches of electrical signals, so as to obtain four branches of filtered electrical signals; two differential units for respectively obtaining differences between two adjacent branches among the four branches of filtered electrical signals, so as to obtain two branches of differential signals; the power detection unit comprises: two squarers for respectively squaring the two branches of differential signals, so as to obtain two branches of square values; and an adder for obtaining a sum of the two branches of square values.

Excursus 6: The external modulator monitoring device according to Excursus 1, wherein the mixing unit is a symmetrical mixing unit.

Excursus 7: The external modulator monitoring device according to Excursus 1, wherein the external modulator is a single MZ modulator or a multi-branch MZ modulator.

Excursus 8: An external modulator monitoring method for monitoring an external modulator, which method comprises: a mixing process for mixing optical signals modulated by the external modulator and optical signals not modulated by the external modulator, so as to obtain multiple branches of mixed optical signals; a photovoltaic conversion process for converting the multiple branches of mixed optical signals into corresponding multiple branches of electrical signals; a differential process for performing a differential processing on voltages of the multiple branches of electrical signals to obtain differential signals; and a power detection process for detecting power of the differential signals.

Excursus 9: The external modulator monitoring method according to Excursus 8, wherein the mixing process mixes optical signals modulated by the external modulator and optical signals not modulated by the external modulator into three branches of mixed optical signals; the differential process comprises: respectively converting the three branches of mixed optical signals into electrical signals, so as to obtain three branches of electrical signals; respectively filtering the three branches of electrical signals, so as to obtain three branches of filtered electrical signals; obtaining differences between the voltages of every two branches of filtered electrical signals among the three branches of filtered electrical signals, so as to obtain three branches of differential signals; the power detection process comprises: respectively squaring the three branches of differential signals, so as to obtain three branches of square values; and obtaining a sum of the three branches of square values.

Excursus 10: The external modulator monitoring method according to Excursus 8, wherein the mixing process mixes optical signals modulated by the external modulator and optical signals not modulated by the external modulator into four branches of mixed optical signals; the differential process comprises: respectively converting the four branches of mixed optical signals into electrical signals, so as to obtain four branches of electrical signals; respectively filtering the four branches of electrical signals, so as to obtain four branches of filtered electrical signals; respectively obtaining differences between two adjacent branches among the four branches of filtered electrical signals, so as to obtain two branches of differential signals; the power detection process comprises: respectively squaring the two branches of differential signals, so as to obtain two branches of square values; and obtaining a sum of the two branches of square values.

The aforementioned device and method of the present invention can be implemented via hardware, and can also be implemented via hardware combined with software. The present invention involves such a computer-readable program that, when being executed by a logical component part, enables the logical component part to implement the device or constituent parts thereof as described above, or enables the logical component part to implement the various methods or steps thereof as described above. The present invention also involves a storage medium, such as a hard disk, a magnetic disk, an optical disk, a DVD, or a flash memory, for storing the program.

The present invention is described with reference to specific embodiments above, but it should be clear to persons skilled in the art that these descriptions are merely exemplary in nature, rather than restrictive to the protection scope of the present invention. Persons skilled in the art may make various variations and modifications within the spirit and principle of the present invention, and these variations and modifications shall all be covered within the scope of the present invention.

The invention claimed is:

1. An external modulator monitoring device for monitoring an external modulator, comprising:
    a mixing unit to mix optical signals modulated by the external modulator and optical signals not modulated by the external modulator, so as to obtain a multiple branches of mixed optical signals;
    an electrical differential unit to convert the multiple branches of mixed optical signals into corresponding multiple branches of electrical signals, and perform a differential processing on voltages of the multiple branches of electrical signals to obtain differential signals; and
    a power detection unit to detect power of the differential signals;
    wherein
        the mixing unit is a 3×3 optical coupler to mix optical signals modulated by the external modulator and optical signals not modulated by the external modulator into three branches of mixed optical signals;
        the electrical differential unit is a differential filter unit comprising:
            three photovoltaic transformers respectively to convert the three branches of mixed optical signals into electrical signals, so as to obtain three branches of electrical signals;
            three filters respectively to filter the three branches of electrical signals, so as to obtain three branches of filtered electrical signals;
            three differential units to obtain differences between the voltages of every two branches of filtered electrical signals among the three branches of filtered electrical signals, so as to obtain three branches of differential signals,
        the power detection unit comprising:
            three squarers respectively to square the three branches of differential signals, so as to obtain three branches of square values; and
            an adder to obtain a sum of the three branches of square values.

2. An external modulator monitoring device for monitoring an external modulator, comprising:
    a mixing unit to mix optical signals modulated by the external modulator and optical signals not modulated by the external modulator, so as to obtain a multiple branches of mixed optical signals;
    an electrical differential unit to convert the multiple branches of mixed optical signals into corresponding multiple branches of electrical signals, and perform a differential processing on voltages of the multiple branches of electrical signals to obtain differential signals; and a power detection unit to detect power of the differential signals;

wherein the mixing unit is a 3×3 optical coupler to mix optical signals modulated by the external modulator and optical signals not modulated by the external modulator into three branches of mixed optical signals;

the electrical differential unit is a differential filter unit comprising:

three photovoltaic transformers respectively to convert the three branches of mixed optical signals into electrical signals, so as to obtain three branches of electrical signals;

three differential units to obtain differences between the voltages of every two branches of electrical signals among the three branches of electrical signals, so as to obtain three branches of differential signals, three filters respectively to filter the three branches of differential signals, so as to obtain three branches of filtered differential signals;

the power detection unit comprising:

three squarers respectively to square the three branches of filtered differential signals, so as to obtain three branches of square values; and an adder to obtain a sum of the three branches of square values.

3. The external modulator monitoring device according to claim 1 or claim 2, wherein the mixing unit is a symmetrical mixing unit.

4. The external modulator monitoring device according to claim 1 or claim 2, wherein the external modulator is a single MZ modulator or a multi-branch MZ modulator.

5. An external modulator monitoring method for monitoring an external modulator, comprising:

mixing optical signals modulated by the external modulator and optical signals not modulated by the external modulator, so as to obtain a multiple branches of mixed optical signals;

converting the multiple branches of mixed optical signals into corresponding multiple branches of electrical signals;

performing a differential processing on voltages of the multiple branches of electrical signals to obtain differential signals; and detecting power of the differential signals;

wherein the mixing mixes optical signals modulated by the external modulator and optical signals not modulated by the external modulator into three branches of mixed optical signals;

the performing comprising:

respectively converting the three branches of mixed optical signals into electrical signals, so as to obtain three branches of electrical signals;

respectively filtering the three branches of electrical signals, so as to obtain three branches of filtered electrical signals;

obtaining differences between the voltages of every two branches of filtered electrical signals among the three branches of filtered electrical signals, so as to obtain three branches of differential signals, the detecting comprising:

respectively squaring the three branches of differential signals, so as to obtain three branches of square values; and obtaining a sum of the three branches of square values.

* * * * *